Dec. 13, 1932.  T. C. DELAVAL-CROW  1,890,844
SHAFT MOUNTING AND LUBRICATOR
Filed Oct. 19, 1927
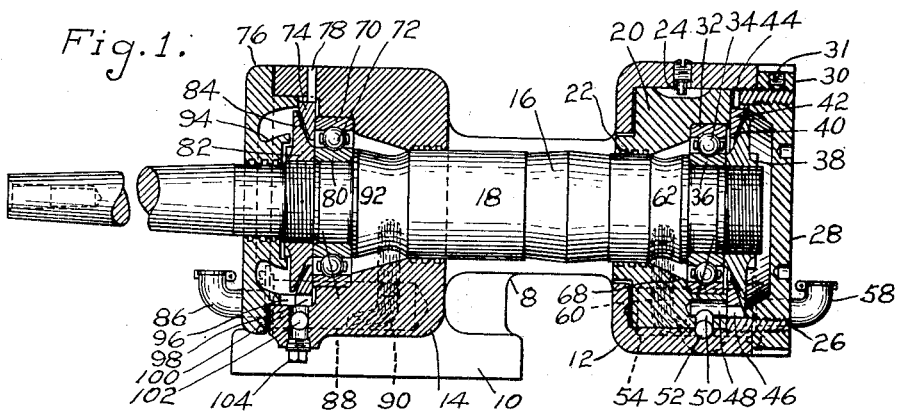
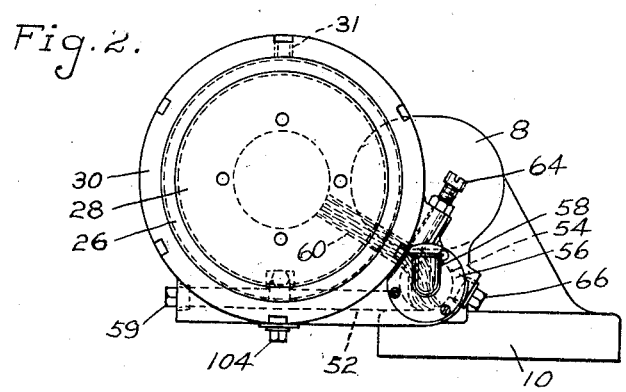
INVENTOR:
THOMAS C. DELAVAL-CROW
By
HIS ATTORNEY.

Patented Dec. 13, 1932

1,890,844

UNITED STATES PATENT OFFICE

THOMAS C. DELAVAL-CROW, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

SHAFT MOUNTING AND LUBRICATOR

Application filed October 19, 1927. Serial No. 227,184.

This invention relates to shaft mountings and lubricators and comprises all the features of novelty herein disclosed. An object of the invention is to provide improved means for lubricating the bearings of a rotary shaft especially a shaft intended for high speed rotation. Another object is to provide devices for circulating lubricant in finely divided form through antifriction bearings and for regulating the supply of lubricant so circulated. To these ends and also to improve generally upon devices of the character indicated the invention consists in the various matters hereinafter described and claimed.

In the drawing, Fig. 1 is a vertical central section of the device and Fig. 2 is an end elevation.

In the drawing, the numeral 8 indicates a head having a base plate 10 and two projecting housings 12 and 14 which are spaced apart to allow access of a driving belt to a pulley 16 on a shaft or spindle 18 which is journalled on the head for high speed rotation. Slidably received with an accurate fit in the housing 12 is a bearing housing or sleeve 20 having grease grooves at 22 to make a close joint with a cylindrical portion of the shaft. The bearing housing 20 is longitudinally slotted at the periphery to receive a pin or key 24 projecting radially inwards from the housing 12 to hold the bearing housing against rotation while permitting axial movement for adjustment. The bearing housing is extended axially beyond the end of the housing 12 as at 26 where it is threaded internally and externally, the inner threads receiving a threaded closure plate 28 and the outer threads receiving an adjusting ring nut 30 which abuts against the end of the housing 12. A set screw 31 holds the ring nut from rotation after it is adjusted to place the bearing housing 20 in the proper position to put an initial load on the antifriction bearings as will appear.

An outer race ring 32 of an antifriction bearing, herein shown as a ball bearing 34, is press fitted in a recess of the bearing housing 20 against a shoulder therein. An inner race ring 36 is press fitted on the shaft against a shoulder and is clamped by a nut 38, the nut also having a slinger portion with a conical pumping face 40 which is spaced slightly from a similar conical face on a ring 42 which fits against a shoulder in the bearing housing and is held from rotation by a pin 44 passing radially through the bearing housing into a slot in the periphery of the ring. The closure plate 28 is centrally recessed or cupped and its rim abuts against and holds the ring 42 from axial movement with respect to the bearing housing. The cooperating conical faces slope outwardly and away from the bearing and act as a suction pump to draw lubricant in finely divided form through the antifriction bearing, the oil passing from the cupped recess in the closure plate into an opening 46 at the bottom of the ring 42, then into a registering opening 48 in the bearing housing, then through a radial opening 50 in the bearing housing to a tangential passage 52 which connects with a reservoir 54. The reservoir is formed outside the housing 12 by a cylindrical recess in the head and is closed at the end by a cap 56, an oil cup 58 for receiving a supply of oil maintaining the oil by gravity at a level which will intersect the conical pumping surfaces in the bearing housing. The tangential passage 52 is closed by a removable drain plug 59.

The housing 12 and the bearing housing 20 are radially bored at an inclination to receive a wick 60 of felt or the like which extends from the reservoir laterally and upwardly at a small inclination to a grooved and tapered portion 62 of the shaft. The oil is drawn upwardly and radially to the shaft by the capillary action of the wick and is spread by the tapered portion 62 as a thin film, the rapid rotation of the shaft throwing it off as a fine mist at one side of the bearing through which it is sucked by the centrifugal pumping action of the conical faces located on the other side of the bearing. The rate of flow of oil through the wick is regulated by an adjusting screw 64 which is threaded in the head to abut against the side of the wick to compress it to the desired degree. A threaded plug 66 closes the reservoir where the wick is passed through it into the radial openings in the housings. The bearing housing is made internally conical at 68 so that, when the spindle is stationary, oil will drain down and collect in pools at the outer race ring to insure ample lubrication when the shaft is started. The conical face at 68 has a steeper slant than the tapered portion 62 of the shaft to leave a space for atomizing the oil.

The tool end of the shaft or spindle is similarly mounted and lubricated in the housing 14. An outer race ring 70 of an antifriction bearing 72 is held against a shoulder in the housing by a ring 74 clamped by a closure plate 76, the ring being held from rotation by a pin 78. An inner race ring 80 is clamped against a shoulder on the shaft by a nut 82 which has a conical pumping face 84 for cooperation with a cooperating conical face on the stationary ring 74. Oil is supplied through an oil cup 86 to a reservoir 88 in the head and is drawn upwardly by a wick 90 to a tapered spreading portion 92 of the shaft. As a fine mist, the oil is then sucked through the bearing, collects in a groove 94 in the closure plate and drains through ports 96, 98, 100 to a tangential passage 102 which carries it to the reservoir. A continuous circulation of oil through the bearings is thus insured. When oil is fed in drops upon rapidly rotating parts, it is thrown off in large globules which are prevented from passing through a bearing by the rapidly revolving separator and rolling elements but, when supplied as a fine mist as in the present invention, it can be sucked through the bearings and there is no tendency to produce heat by churning of an oversupply of lubricant. The port 100 is closed by a removable drain plug 104.

The shaft or spindle is held from radial and axial play by the bearings, the outer race ring 32 being adjustable with its housing as above described to place an initial load on the bearings which makes them assume the angular contact relation indicated by the inclined lines. Cramping or overloading of the bearings due to spindle expansion is avoided because the arrangement of contact angles is such as to diminish the initial load in proportion to the tendency of expansion and the bearings run cool.

I claim:

1. In a device of the character described, a housing, a shaft having a bearing in the housing, the shaft having a tapered portion for forming a thin film of lubricant supplied to the shaft, a lubricant reservoir, a wick extending at a small inclination from the reservoir into contact with the tapered portion of the shaft, means for rotating the shaft to cause the film of lubricant to blow into a fine mist, and means at the other side of the bearing for drawing the lubricant through the bearing and comprising a stationary conical face on the housing and a rotary conical face in closely adjacent pumping relation thereto; substantially as described.

2. In a device of the character described, a housing, a rotary shaft having a bearing in the housing, a member fixed to the shaft at one side of its bearing and having a conical, lubricant pumping face running in closely adjacent relation to a similar stationary face in the housing, a lubricant reservoir having communication with the faces, and a wick extending from the reservoir into contact with the shaft at the opposite side of the bearing from the lubricant pumping face, the shaft and the housing being spaced apart at the wick to form a chamber for finely divided lubricant; substantially as described.

3. In a device of the character described, a housing, a rotary shaft having a bearing in the housing, means for conducting lubricant to the shaft at one side of its bearing, a member having a stationary conical face at the other side of the bearing, and a member fixed to the rotary shaft and having a conical pumping face in closely adjacent relation to the stationary conical face, the conical faces slanting outwardly away from the bearing and the shaft to suck lubricant through the bearing from one side to the other; substantially as described.

4. In a device of the character described, a housing, a shaft having a bearing in the housing, a lubricant reservoir outside the housing, a wick extending radially through the housing from the reservoir to the shaft, the wick being straight and having a small inclination and contacting with the shaft at one side of the bearing, means at the other side of the bearing for drawing lubricant through the bearing, and means for directing the lubricant back to the reservoir for circulation; substantially as described.

5. In a device of the character described, a housing, a rotary shaft having a bearing in the housing, a reservoir, means for conducting lubricant from the reservoir to the shaft at one side of the bearing, a ring fixed in the housing at the other side of the bearing and having a conical face, a nut on the end of the shaft and having a conical face running in closely adjacent relation to the conical face on the ring to suck lubricant through the bearing, and a recessed closure plate for holding the ring in the housing and enclosing the end of the shaft; substantially as described.

6. In a device of the character described, a housing, a rotary shaft having a bearing in the housing, a reservoir, means for conducting lubricant from the reservoir to the shaft, means for throwing lubricant from the shaft in a mist at one side of the bearing, a ring fitted in the housing at the other side of the bearing and having a conical face, a nut on the shaft and having a conical face, the conical faces sloping outwardly and away from the bearing and being arranged in closely spaced relation to suck the mist of lubricant through the bearing and around the nut; substantially as described.

7. In a device of the character described, a housing, a shaft, an antifriction bearing having rolling elements between the shaft and the housing, means for producing a mist of lubricant in the housing at one side of the antifriction bearing, cooperating pumping faces at the other side of the bearing, one of said faces being carried by the shaft and the other by the housing, the faces being closely adjacent and tapering outwardly away from the rolling elements, and means for causing relative rotation of the shaft and housing to produce a pumping effect at the tapered faces for sucking the lubricant between the rolling elements from one side of the bearing to the other; substantially as described.

8. In a device of the character described, a housing, a shaft, an antifriction bearing having rolling elements between the shaft and the housing, means for producing a mist of lubricant in the housing at one side of the antifriction bearing, cooperating pumping faces at the other side of the bearing, one of said faces being carried by the shaft and the other by the housing, the faces being closely adjacent and tapering outwardly away from the rolling elements, means for causing relative rotation of the shaft and housing to produce a pumping effect at the tapered faces for sucking the lubricant between the rolling elements from one side of the bearing to the other, and the housing being internally tapered at one side of the bearing with the portion of largest diameter next to the bearing to collect lubricant at the bearing when said means is not in operation; substantially as described.

In testimony whereof I hereunto affix my signature.

THOMAS C. DELAVAL-CROW.